US008267240B2

(12) United States Patent  (10) Patent No.: US 8,267,240 B2
Moreland et al.  (45) Date of Patent: Sep. 18, 2012

(54) AUGER CONVEYOR

(75) Inventors: Brian S. Moreland, Modoc, IN (US);
Bradley A. Miller, Winchester, IN (US);
Jamie R. Whitesel, Union City, IN (US);
R. Duane Brim, Winchester, IN (US)

(73) Assignee: Applegate Livestock Equipment, Inc., Union City, IN (US)

( * ) Notice: Subject to any disclaimer, the term of this patent is extended or adjusted under 35 U.S.C. 154(b) by 0 days.

(21) Appl. No.: 13/424,020

(22) Filed: Mar. 19, 2012

(65) Prior Publication Data
US 2012/0199446 A1 Aug. 9, 2012

Related U.S. Application Data

(63) Continuation of application No. 12/901,190, filed on Oct. 8, 2010, now Pat. No. 8,136,654.

(60) Provisional application No. 61/251,928, filed on Oct. 15, 2009.

(51) Int. Cl.
*B65G 33/32* (2006.01)
(52) U.S. Cl. ......................... 198/666; 198/672; 384/258
(58) Field of Classification Search .................. 198/666, 198/667, 672, 673, 674; 384/252, 258, 259
See application file for complete search history.

(56) References Cited

U.S. PATENT DOCUMENTS

| 3,215,257 | A | 11/1965 | Albers |
| 3,289,819 | A | 12/1966 | Steinmetz |
| 3,351,395 | A | 11/1967 | Stone |
| 3,820,860 | A | 6/1974 | Stone |
| 4,025,131 | A | 5/1977 | Bergquist et al. |
| 4,217,980 | A | 8/1980 | Kemp |
| 4,220,242 | A | 9/1980 | Forsberg |
| 4,384,643 | A | 5/1983 | Cone |
| 4,621,968 | A | 11/1986 | Hutchison |
| 5,370,464 | A | 12/1994 | Blaha |
| 5,899,319 | A | 5/1999 | Jarnagin |
| 8,136,654 | B2 * | 3/2012 | Moreland et al. ............. 198/666 |

* cited by examiner

*Primary Examiner* — James R Bidwell
(74) *Attorney, Agent, or Firm* — O'Shea Getz P.C.

(57) ABSTRACT

An auger conveyor includes a housing, at least one first mounting bracket, at least one second mounting bracket, an auger screw and one or more auger support assemblies. The first mounting bracket has a first landing and the second mounting bracket has a second landing. The first and second mounting brackets are attached to the housing at diametrically opposite positions. The one or more auger support assemblies each have a lateral member connected to a bushing assembly. The auger screw has a rotational axis and is rotatably mounted relative to the bushing assembly. First and second ends of the lateral member each have a geometry adapted to slidably engage with the first and second landings, respectively. The auger screw and the one or more auger support assemblies are adapted to be received within and removed from the housing as an assembled unit, through the first end of the housing.

19 Claims, 5 Drawing Sheets

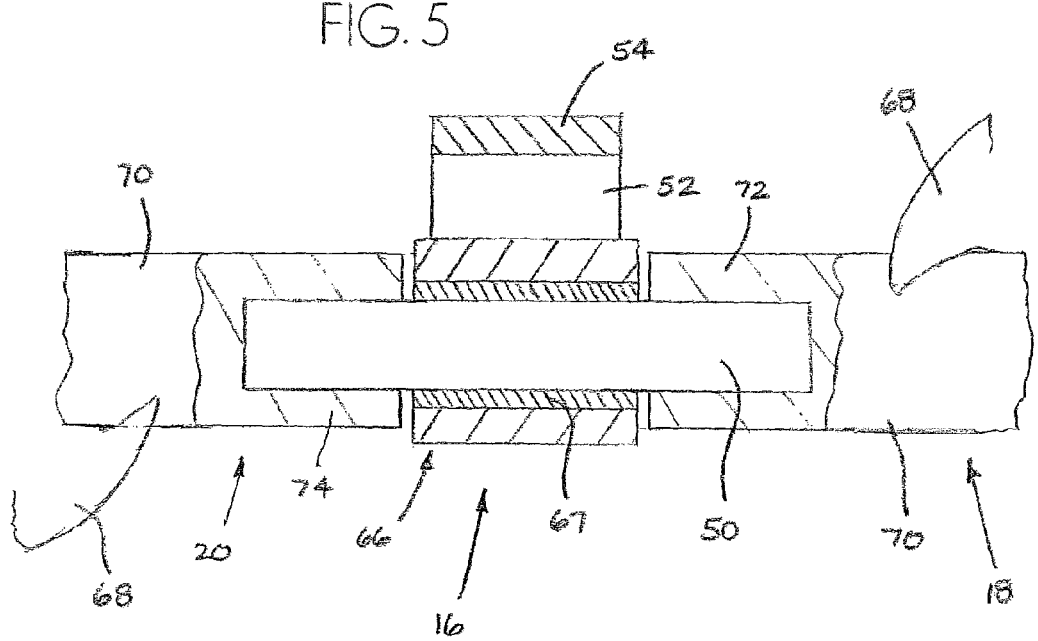

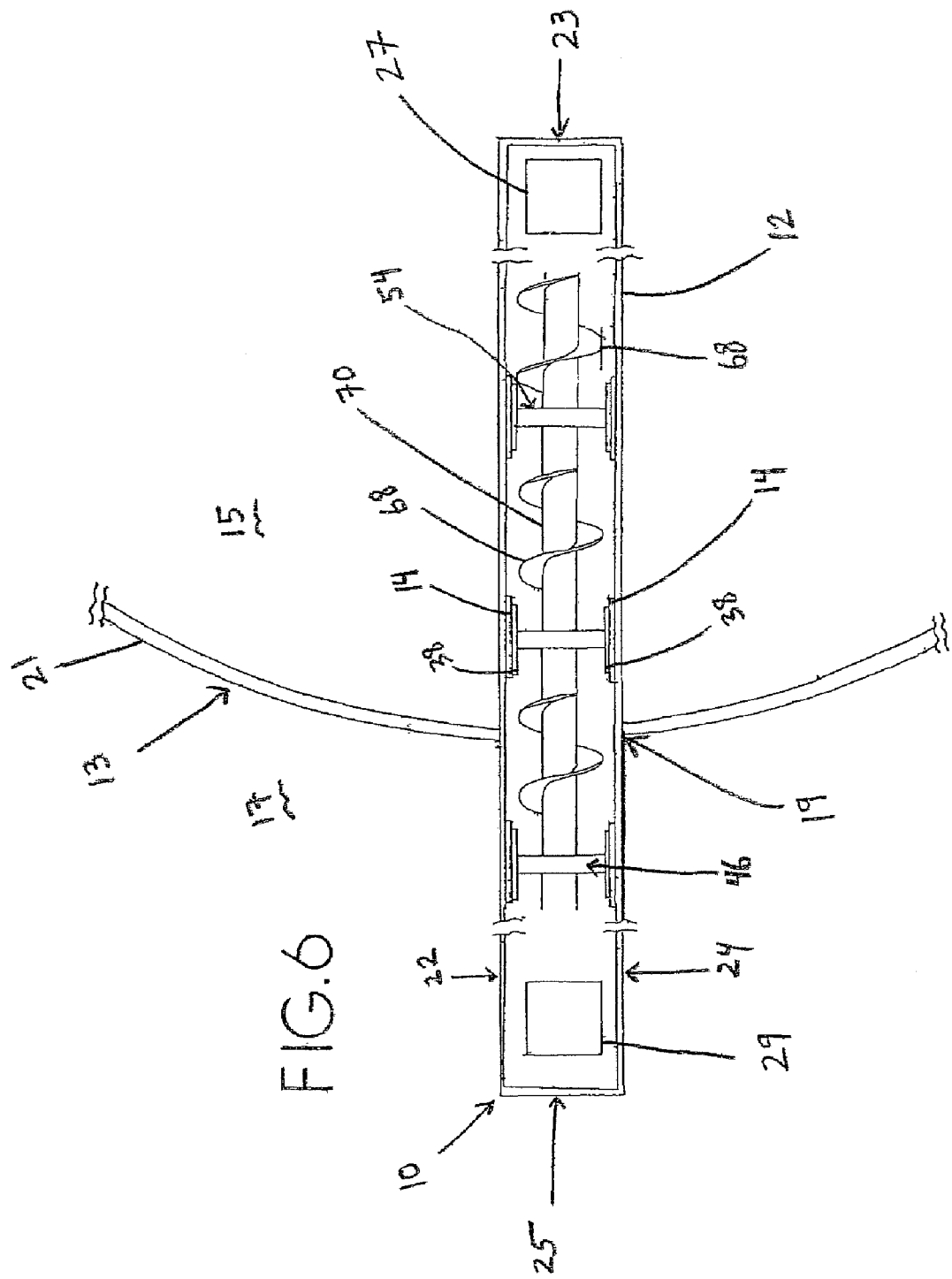

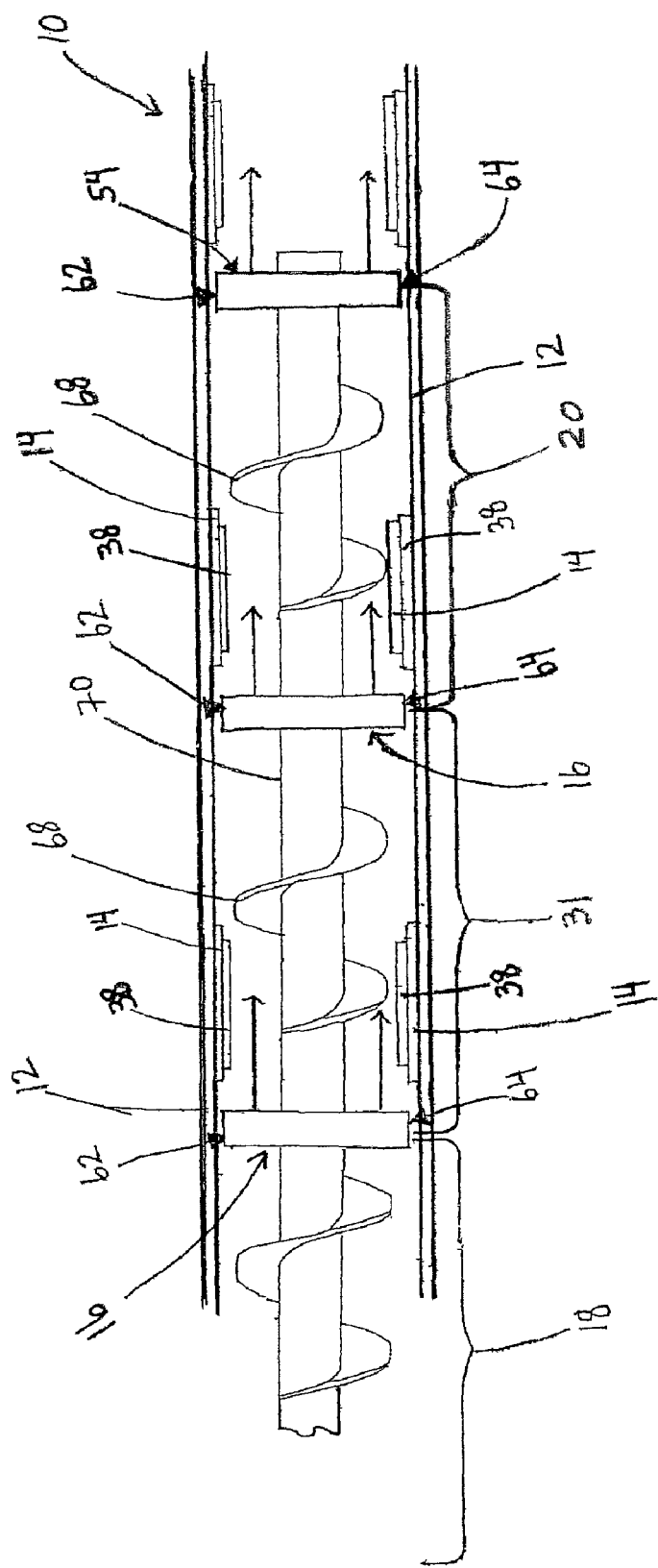

AUGER CONVEYOR

CROSS-REFERENCE TO RELATED APPLICATIONS

This application is a continuation of U.S. patent application Ser. No. 12/901,190 filed Oct. 8, 2010, the disclosure of which is herein incorporated by reference. This application also claims priority benefits under 35 U.S.C. §119(e) of U.S. Provisional Patent Application No. 61/251,928 filed Oct. 15, 2009, the disclosure of which is herein incorporated by reference.

BACKGROUND OF THE INVENTION

1. Technical Field

This disclosure relates to auger conveyors in general, and to auger conveyors engaged with a storage silo in particular.

2. Background Information

Auger conveyors can be used to convey rice, grain and other bulk material, to load and unload storage silos, and to feed processing equipment. Auger conveyors typically include a helical auger screw disposed within a housing or trough. In operation, the auger screw rotates about its longitudinal axis to convey material along the length of the conveyor. A bearing assembly at one end of the conveyor and a drive assembly at the other end of the conveyor enable the auger screw to rotate within the housing.

Some auger conveyors have a considerable length that can create operational issues under certain circumstances. For example, if the auger conveyor includes a series of lengthy and conjoined auger screw sections mounted on a common drive shaft and surrounded by a conveyor housing or trough, it is necessary to support the auger screw to prevent deflection of the auger screw during operation. Supports are usually attached to bearings which are rotatably engaged with the auger screw. Proper support and alignment of the auger screw within a trough is crucial since deflection of the drive shaft and auger screw sections during operation, or misalignment between auger screw sections during operation, can cause the auger screw's helical flights to contact the interior of the conveyor housing, depositing abraded metal shavings or other foreign matter within the conveyed product. Misalignment further results in reduced component life due to wear and abrasion, unsafe work conditions, and products contaminated by the worn components.

In the case of food handling or processing systems, since the food products are in intimate contact with the auger screw, sanitation and health regulations require that the auger conveyers be capable of thorough cleaning. Removal of the auger screw from the conveyor housing is necessary to properly clean the auger screw, and thus most auger conveyors are designed such that the auger screw can be removed from the conveyor housing. When cleaning of the auger conveyer is required on a routine basis, it is desirable to keep the process to a minimum in terms of the time, tools and personnel skills required. Most auger conveyors are designed, however, such that lengthy and laborious disassembly and reassembly is required to remove the auger screw from the conveyor housing.

What is needed is an auger conveyor that overcomes these problems.

SUMMARY OF THE DISCLOSURE

According to an aspect of the present invention, an auger conveyor is provided that includes a housing, a first mounting bracket, a second mounting bracket, a first auger screw section, a second auger screw section, a coupling shaft, and an auger support assembly. The housing has at least one end. The first mounting bracket comprises a pair of parallel rails that faun a first landing. The second mounting bracket comprises a pair of parallel rails that form a second landing. The first mounting bracket and the second mounting bracket are attached to the housing at locations so as to be positioned diametrically opposite one another. The first auger screw section is attached to a first end of the coupling shaft. The second auger screw section is attached to a second end of the coupling shaft. The auger support assembly includes a lateral member connected to a bushing assembly. The lateral member has a first end and a second end. The coupling shaft is rotatably mounted within the bushing assembly. The first end and second end of the lateral member have geometries that are adapted to slidably engage with the first landing of the first mounting bracket and the second landing of the second mounting bracket, respectively. The auger support assembly and the coupling shaft are located within the housing. The first end and second end of the lateral member are engaged with, but not affixed to, the first landing of the first mounting bracket and the second landing of the second mounting bracket, respectively, to support the coupling shaft within the housing and enable slidable insertion and removal of the auger support assembly, coupling shaft and first and second auger screw sections from an end of the housing.

According to another aspect of the present invention, an auger conveyor is provided that includes a housing, at least one first mounting bracket, at least one second mounting bracket, an auger screw, and one or more auger support assemblies. The housing has a first end and a second end. Each first mounting bracket has a first landing, and each second mounting bracket has a second landing. The first and second mounting brackets are attached to the housing and are positioned diametrically opposite one another. The auger screw has a rotational axis. The one or more auger support assemblies each have a lateral member connected to a bushing assembly. The lateral member has a first end and a second end. The auger screw is rotatably mounted relative to the bushing assembly. The first end and second end of the lateral member each have a geometry adapted to slidably engage with the first landing of the first mounting bracket and the second landing of the second mounting bracket, respectively. The auger screw and the one or more auger support assemblies are adapted to be received within the housing as an assembled unit, by insertion through the first end of the housing. Upon full insertion into the housing, the first and second ends of each lateral member are engaged with, but not affixed to, the first landing of the first mounting bracket and the second landing of the second mounting bracket, respectively, to support the auger screw within the housing. The auger screw and auger support assembly are further adapted to be slidably removed from the housing as an assembled unit through the first end of the housing.

These and other objects, features and advantages of the present invention will become more apparent in light of the following detailed description of preferred embodiments thereof, as illustrated in the accompanying drawings.

BRIEF DESCRIPTION OF THE DRAWINGS

FIG. 5 is an axial cross-section diagrammatic illustration of the auger support assembly in FIG. 4.

FIG. 6 is a cross-section diagrammatic illustration of an auger conveyor engaged with a storage silo.

FIG. 7 is a cross-section diagrammatic illustration of the assembly of an auger conveyor.

DETAILED DESCRIPTION OF THE INVENTION

Figure 1:
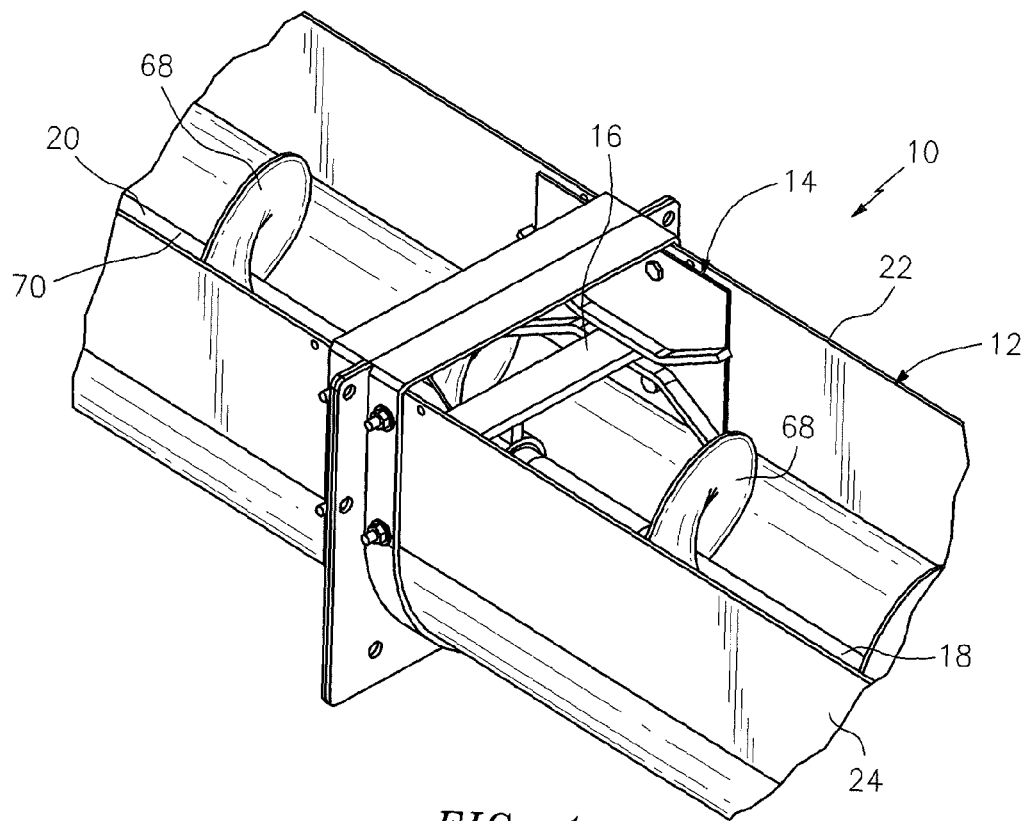
FIG. 1 is a diagrammatic illustration of one embodiment of an auger conveyor.
Figure 2:
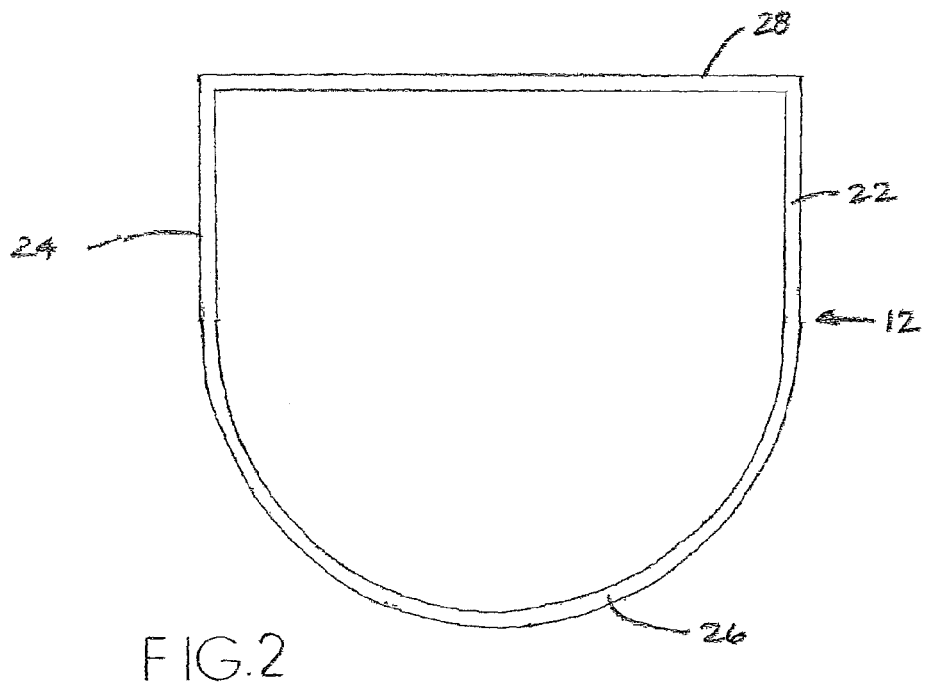
FIG. 2 is a cross-section diagrammatic illustration of an auger conveyor housing.
Figure 3:
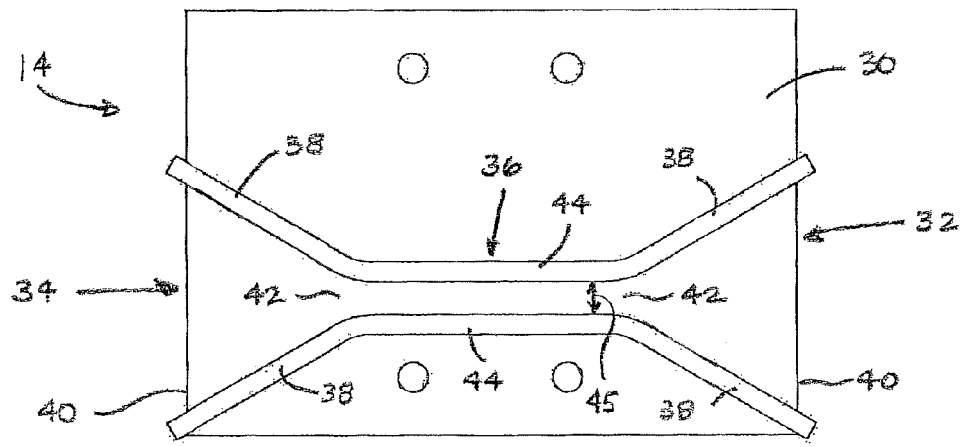
FIG. 3 is a diagrammatic illustration of one embodiment of a mounting bracket.
Figure 4:
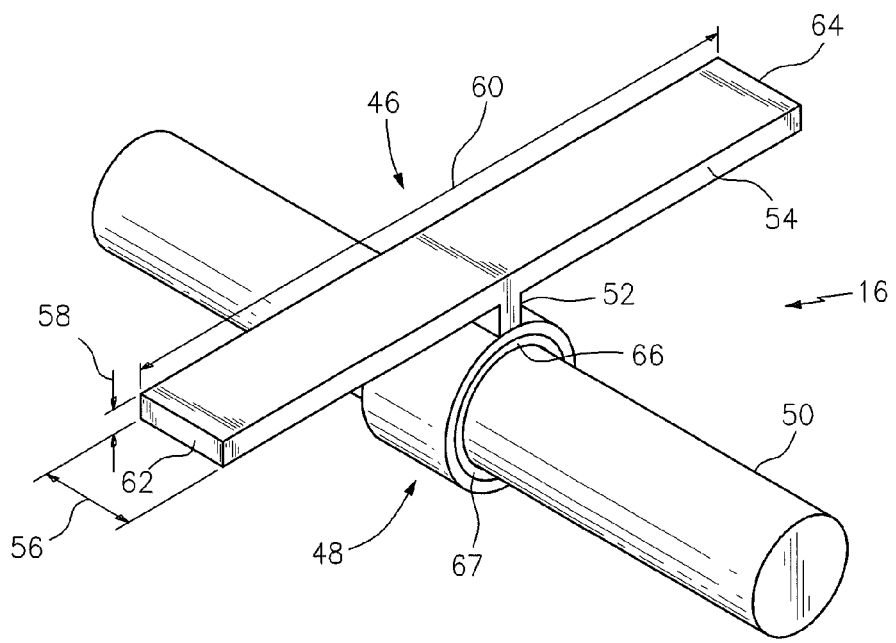
FIG. 4 is a diagrammatic illustration of one embodiment of an auger support assembly.

FIG. 1 is a diagrammatic illustration of one embodiment of an auger conveyor 10. The auger conveyor 10 includes a conveyor housing 12, at least one mounting bracket 14, at least one auger support assembly 16, and an auger screw that includes a plurality of auger screw sections 18, 20.

Referring to FIGS. 1, 2, 6 and 7, the conveyor housing 12 has a first side 22, a second side 24, a base 26, and a top 28. The conveyor housing 12 extends longitudinally between an inlet 27 and an outlet 29. The inlet 27 and outlet 29 of the conveyor housing 12 can have any geometry that permits the bulk material to enter into the auger conveyor 10 and be moved out of the auger conveyor 10, respectively. The conveyor housing 12 illustrated in FIGS. 1, 2, 6 and 7 has a "U-shaped" cross-sectional geometry extending longitudinally between the first end 23 and the second end 25. The invention is not limited to a U-shaped geometry, however. As is shown in FIG. 6, the auger conveyor 10 is engaged with a storage silo 13. The storage silo 13 has an interior 15 and an exterior 17. The auger conveyor 10 passes through an opening 19 in the siding 21 of the storage silo 13. The auger conveyor 10 is located towards the base of the storage silo 13, and thus the bulk materials stored in the storage silo 13 rest atop the portion of the conveyor housing 12 that is located in the interior 15 of the storage silo 13. The bulk materials stored in the interior 15 of the storage silo 13 pass through the inlet 27 of the conveyor housing 12 and, upon operation of the auger conveyor 10, are moved through the conveyor housing 12 until they reach the outlet 29 of the conveyor housing 12.

In the embodiment shown in FIGS. 1, 3, 6 and 7, the (at least one) pair of mounting brackets includes a first mounting bracket 14 and a second mounting bracket 14. Each of the first and second mounting brackets 14 includes a plate 30, a forward tapered region 32, an aft tapered region 34, and a landing 36. Each of the tapered regions 32, 34 is formed by a pair of rails 38 attached to the plate 30. The rails 38 taper from an open end 40 to landing end 42. A pair of parallel rails 44 forms the landing 36 extending between the landing ends 42 of the forward and aft tapered regions 32, 34. The landing rails 44 are separated by a gap having a height 45. Each mounting bracket 14 has a geometry adapted to mate with one or both of first side 22 and second side 24 of the conveyor housing 12. The mounting brackets 14 are constructed from a rigid durable material; e.g., steel.

The auger support assembly 16 includes a housing support 46, a bushing assembly 48, and a coupling shaft 50. The embodiment shown in FIGS. 1, 4, 6 and 7 illustrates a T-shaped housing support 46 that includes a connecting member 52 and a lateral member 54. The connecting member 52 extends between the bushing assembly 48 and the lateral member 54. The lateral member 54 has a width 56, a thickness 58, and a length 60 that extends between a first end 62 and a second end 64. The bushing assembly 48 has a bore 66 for receiving the coupling shaft 50. In some embodiments, the bushing assembly 48 includes a bushing 67 (or bearing) mounted within the bushing assembly 48. The bushing 67 permits substantially unimpeded rotation of the coupling shaft 50 within the bore 66; e.g., the coupling shaft 50 acts as a bearing journal received within the bushing 67. In other embodiments, a bushing could be mounted on the coupling shaft 50 and the bushing assembly 48 could have a bearing journal that allows relative rotation. Each end of the coupling shaft 50 includes means for attaching the coupling shaft 50 to an auger screw section (e.g., mechanical fastener, screw thread, etc.). In some embodiments, the auger screw comprises only one continuous section (i.e., the auger screw does not comprise multiple sections). In such embodiments, the bushing assembly 48 may have a bore 66 that is adapted to receive the center shaft 70 of the auger screw or, alternatively, a bushing may be mounted on the center shaft 70 and the bushing assembly 48 may have a bearing journal that allows relative rotation.

Referring to FIGS. 1, 5, 6 and 7, each auger screw section 18, 20 includes a helical flight 68 attached to a center shaft 70. The helical flight 68 extends around the circumference of the center shaft 70 at a pitch that defines the distance bulk material will move on average in one rotation of the auger screw. For ease of description, the present invention will be described in terms of an auger conveyor 10, illustrated in FIGS. 1 and 5, having only two auger screw sections: a drive auger screw section 18 and a distal auger screw section 20. The drive auger screw section 18 has a coupling end 72 and a drive end (not shown). The coupling end 72 is configured to mate with the coupling shaft 50; e.g., a male/female configuration wherein the coupling end 72 has an aperture for receiving a portion of the coupling shaft 50. The drive end has a configuration that allows the drive auger screw section 18 to be directly or indirectly coupled with a drive unit for driving the auger screw. The distal auger screw section 20 includes a coupling end 74 and a support end (not shown). The coupling end 74 is similar to that of the drive auger screw section 18; e.g., a female end that receives the male coupling shaft 50. The support end is typically configured to cooperate with a bearing supported by the conveyor housing 12.

Referring to FIGS. 6 and 7, in an alternative auger conveyor 10 embodiment, the auger screw has more than two auger screw sections: a drive auger screw section 18, a distal auger screw section 20, and at least one middle auger screw section 31 disposed therebetween. In such configurations, the middle auger screw sections 31 will have end configurations that allow connection to an auger support assembly 16; e.g., coupling ends.

When the auger conveyor 10 is assembled, the first and the second mounting brackets 14 are attached to the conveyor housing sides 22, 24, diametrically opposed to one another at a particular position along the longitudinal length of the conveyor housing 12, and aligned with one another; e.g., so that the landings 36 from each plate 30 are aligned with one another, etc.

Referring to FIGS. 1 and 5, before installation of the auger screw into the conveyor housing 12, the drive auger screw section 18 and the distal auger screw section 20 are coupled to an auger support assembly 16. The combined auger screw sections 18, 20 and auger support assembly 16 are then slid into the conveyor housing 12 from an end of the conveyor housing 12. The U-shaped geometry of the conveyor housing 12 is preferable because the geometry maintains the housing support 46 of the auger support assembly 16 in a desired position as it is inserted into the conveyor housing 12 (e.g., the housing support 46 geometry prevents the auger support assembly 16 from rotating within the conveyor housing 12). As the auger screw is pushed further into the housing, the lateral member 54 of the auger support assembly 16 will encounter the forward tapered region 32 of each mounting bracket 14. Each end 62, 64 of the lateral member 54 will be received within an open end 40 of one of the forward tapered regions 32, and will be guided into the landing 36 of the respective mounting bracket 14. The thickness 58 of the lateral member 54 and the height 45 of the landing 36 form a slide fit that prevents the lateral member 54 from any substantial non-longitudinal movement within the conveyor housing 12. The two section auger screw is thereby supported at each end of the conveyor housing 12 and in the middle of the conveyor housing 12 as well. The bushing 67 within the auger support assembly 16 allows the coupling shaft 50 and attached auger screw sections 18, 20 to rotate freely. This configuration prevents deflection of the auger screw during operation and achieves alignment of the multiple conjoined sections 18, 20 of the auger screw within the conveyor housing, thus preventing the auger screw's helical flights 68 from contact the interior of the conveyor housing 12 and depositing abraded metal shavings or other foreign matter within the conveyed product.

As indicated above, in some auger conveyor 10 embodiments, the auger screw has more than two auger screw sections (e.g., drive auger screw section 18, distal auger screw section 20, and at least one middle auger screw section 31), and the auger screw assembly (e.g., the combined auger screw sections 18, 20, 31 and auger support assembly 16) has more than one auger support assembly 16, which are assembled as described above. FIG. 6 illustrates one such embodiment, and FIG. 7 illustrates assembly thereof. The first auger support assembly 16 will encounter a first pair of mounting brackets 14 as the auger screw is inserted into the conveyor housing 12. The lateral member 54 of the first auger support assembly 16 will be guided into the aligned landings 36 of the first pair of mounting brackets 14 as described above. As the auger screw is inserted further into the housing 12, the lateral member 54 of the first auger support assembly 16 will pass through the landings 36 of the first pair of mounting brackets 14 and into the aft tapered region 34, and will eventually pass out of engagement with the first pair of mounting brackets 14. Further screw insertion will cause the first auger support assembly 16 to encounter a second pair of mounting brackets 14. At the same time, a second auger support assembly 16 will encounter the first pair of mounting brackets 14. The lateral members 54 of each auger support assembly 16 will be guided into the landings 36 of the respective pairs of mounting brackets 14.

When the auger screw is removed from the conveyor housing 12, the aft tapered regions 34 of the mounting brackets 14 guide the lateral members 54 into the landings 36 in the same manner as described above for screw insertion. As a result, the auger screw assembly can be "blindly" inserted and removed from the conveyor housing 12 with the auger support assemblies 16 guided into the respective mounting brackets 14, where the support assemblies 16 provide desirable support to the auger screw and help prevent undesirable movement of the screw within the conveyor housing 12. This insertion and removal of the auger screw is advantageously achieved with relatively minimal disassembly and reassembly of the auger conveyor 10 system. Moreover, the insertion and removal of the auger screw is advantageously achieved without causing the auger screw's helical flights 68 to contact the interior of the conveyor housing 12, thus preventing damage to the interior of the conveyor housing 12 and the deposition of abraded metal shavings or other foreign matter within the conveyed product.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. An auger conveyor, comprising:
 a housing having a first end and a second end;
 at least one mounting bracket attached to the housing;
 an auger screw having a rotational axis; and
 at least one auger support assembly having a lateral member connected to a bushing assembly, wherein the auger screw is rotatably mounted within the bushing assembly, and wherein the lateral member has a geometry adapted to engage with the at least one mounting bracket;
 wherein the auger screw and the at least one auger support assembly are adapted to be received within the housing as an assembled unit, by insertion through the first end of the housing, and upon full insertion into the housing, the lateral member engages with the at least one mounting bracket to support the auger screw within the housing, and the auger screw and auger support assembly are further adapted to be removed from the housing as an assembled unit through the first end of the housing.

2. The conveyor of claim 1, wherein the at least one auger support assembly further comprises a coupling shaft having a first end and a second end, wherein the auger screw comprises a first auger screw section and a second auger screw section, wherein the first auger screw section is attached to a first end of the coupling shaft and a second auger screw section is attached to a second end of the coupling shaft.

3. The conveyor of claim 1, wherein the housing further comprises a first side, a second side, a base and a top, and wherein the housing has a "U-shaped" cross-sectional geometry extending longitudinally between the first end and the second end.

4. The conveyor of claim 3, wherein the at least one auger support assembly has a geometry that prevents the at least one auger support assembly from rotating 360 degrees within the "U-shaped" geometry of the housing.

5. The conveyor of claim 4, wherein the at least one auger support assembly has a "T-shaped" geometry.

6. The auger conveyor of claim 1, wherein the at least one mounting bracket comprises a pair of parallel rails that form a landing.

7. The auger conveyor of claim 1, wherein the at least one mounting bracket includes a plate, a forward tapered region, and an aft tapered region.

8. The auger conveyor of claim 1, wherein the at least one mounting bracket includes a first mounting bracket and a second mounting bracket, wherein the first and second mounting brackets are attached to the housing at locations so as to be positioned opposite one another.

9. The auger conveyor of claim 8, wherein the first mounting bracket comprises a pair of parallel rails that form a first landing and a second mounting bracket comprising a pair of parallel rails that form a second landing.

10. The auger conveyor of claim 9, wherein upon full insertion of the auger screw and the at least one auger support assembly into the housing, the lateral member of the at least one auger support assembly engages with the first and second mounting brackets to support the auger screw within the housing.

11. An auger conveyor, comprising:
 a housing having at least one end;
 a first mounting bracket;

a first auger screw section attached to a first end of a coupling shaft; and a second auger screw section attached to a second end of the coupling shaft;

an auger support assembly having a lateral member connected to a bushing assembly, wherein the coupling shaft is rotatably mounted within the bushing assembly, and wherein the lateral member has at least one geometry adapted to engage with the first mounting bracket;

wherein the auger support assembly and the coupling shaft are located within the housing, and the lateral member is engaged with the first mounting bracket to support the coupling shaft within the housing and to enable insertion and removal of the auger support assembly, coupling shaft and first and second auger screw sections from the at least one end of the housing.

12. The auger conveyor of claim 11, wherein the first mounting bracket comprises a pair of parallel rails that form a landing.

13. The auger conveyor of claim 11, wherein the first mounting bracket includes a plate, a forward tapered region, an aft tapered region.

14. The auger conveyor of claim 11, wherein the auger support assembly has a "T-shaped" geometry.

15. The auger conveyor of claim 11, wherein auger support assembly further includes a rotatably mounted connecting member.

16. The auger conveyor of claim 11, further comprising a second mounting bracket, wherein the first and second mounting brackets are attached to the housing at locations so as to be positioned diametrically opposite one another.

17. The auger conveyor of claim 12, wherein the first mounting bracket comprises a pair of parallel rails that form a first landing and the second mounting bracket comprises a pair of parallel rails that form a second landing.

18. The auger conveyor of claim 17, wherein upon insertion of the auger support assembly, coupling shaft and first and second auger screw sections into the housing, the lateral member of the auger support assembly engages with the first and second mounting brackets to support the auger screw within the housing.

19. The auger conveyor of claim 11, wherein the lateral member has at least one geometry adapted to slidably engage with the first mounting bracket.

* * * * *